United States Patent [19]
Smith

[11] 4,060,167
[45] Nov. 29, 1977

[54] METHOD FOR CONVERTING INTERMITTENT TO CONSTANT REFUSE FLOW

[75] Inventor: George Edwin Smith, East Amherst, N.Y.

[73] Assignee: Union Carbide Corporation, New York, N.Y.

[21] Appl. No.: 704,385

[22] Filed: July 12, 1976

[51] Int. Cl.² .............................................. B65G 15/00
[52] U.S. Cl. ................................... 198/622; 198/623; 366/271
[58] Field of Search ............... 198/620, 622, 623, 607; 259/36, 109, 110

[56] References Cited

U.S. PATENT DOCUMENTS

| | | | |
|---|---|---|---|
| 2,301,088 | 11/1942 | Stahl | 198/620 |
| 2,708,503 | 5/1955 | Arnold | 198/622 |
| 2,771,203 | 11/1956 | Collins | 198/607 |
| 2,778,511 | 1/1957 | Hueftle | 198/607 |
| 2,822,024 | 2/1958 | Himmelheber et al. | 198/622 |
| 2,906,393 | 9/1959 | West | 198/629 |
| 3,189,200 | 6/1965 | Arnold | 198/622 |
| 3,365,049 | 1/1968 | Raab | 241/101.5 |
| 3,896,944 | 7/1975 | Idoffsson | 198/607 |

FOREIGN PATENT DOCUMENTS

| | | | |
|---|---|---|---|
| 717,991 | 11/1954 | United Kingdom | 198/620 |

Primary Examiner—Evon C. Blunk
Assistant Examiner—Richard K. Thomson
Attorney, Agent, or Firm—Lawrence G. Kastriner; Warrick E. Lee, Jr.

[57] ABSTRACT

Method for providing surge capacity and for smoothing out the flow rate of refuse in a system, wherein refuse is loaded onto a moving conveyor at variable or intermittent rates, by (1) preventing excess refuse from passing beyond a given point on the conveyor by a rotating leveler, spaced a predetermined distance from the conveyor to permit only the desired level of refuse to remain on the conveyor beyond the leveler, and (2) rotating the leveler at a speed greater than the speed of the conveyor, the direction of rotation of the leveler being opposite to the direction of travel of the refuse on the conveyor. Refuse in excess of the amount desired to be transported by the conveyor is retained behind the leveler as a rolling inventory of refuse, causing the refuse to be discharged from the conveyor at a constant and uniform rate.

5 Claims, 5 Drawing Figures

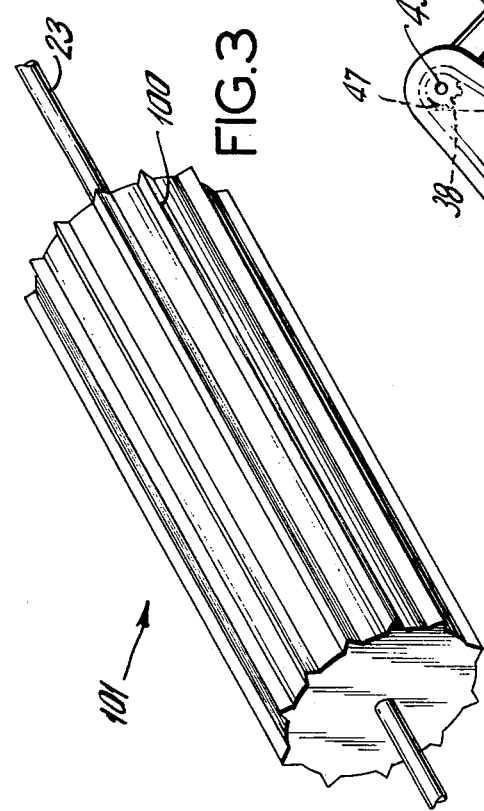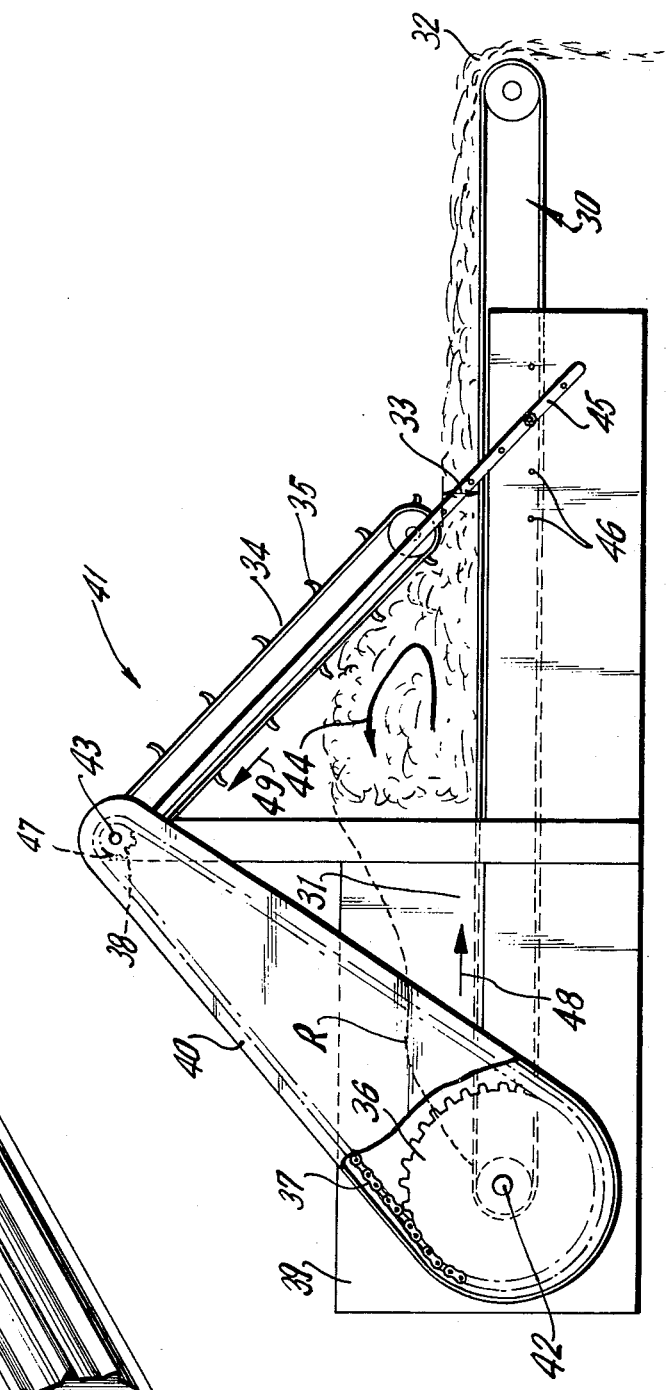

METHOD FOR CONVERTING INTERMITTENT TO CONSTANT REFUSE FLOW

BACKGROUND

This invention relates to a method for smoothing out the flow rate of refuse and for providing surge capacity in a refuse feed system.

It is common in the chemical process industry to require that a continuous process operate with a constant and uniform feed originating from a source which produces the feed at a variable or intermittent rate. In the processing of fluids, smoothing out of the flow rate may be done simply by the use of a surge tank in the system. For solid materials, the same effect can be obtained by use of a feed hopper or a live bottom bin. However, neither of these techniques is satisfactory in the feeding of raw or shredded refuse, since refuse has a tendency to settle and compact, if stored in an immobile condition. Attempts at creating an inventory of refuse by storing and transporting this material through a conventional storage hopper tend to result in the material bridging or jamming in the hopper. Consequently, conventional storage or surge systems have been found unsatisfactory for smoothing out the flow of refuse which normally originates from a source which produces it at a variable or intermittent rate, e.g. a dump truck or a refuse shredder.

A conventional means for transferring refuse from a storage area of a refuse treatment plant to a furnace, incinerator or converter is a continuous flow conveyor. Screw and bucket conveyors are also used, but these devices do not generally have the capacity of continuous flow conveyors. Powell et al., in U.S. Pat. No. 3,926,582 discloses a typical continuous conveyor for feeding refuse to a shaft furnace. A conveyor system normally comprises a horizontal section and an inclined section. These may be composed of a single unit or two separate units. If employing a single unit, care must be taken not to deposit too much refuse on the device. However, neither single nor double unit conveyors can successfully store a significant amount of refuse inventory, nor can they handle sudden surges of feed dumped on the conveyor, nor smoothen out the flow of the refuse since they contain no surge capacity.

OBJECTS

It is an object of this invention to provide a method for smoothing out the flow of refuse in a refuse feed system to which refuse is supplied in a variable or intermittent rate.

It is another object of this invention to provide surge capacity in a system for transporting refuse.

It is a still further object of this invention to provide a method for mixing oil, char or sewage sludge with refuse.

SUMMARY OF THE INVENTION

The above and other objects, which will become apparent to those skilled in the art, are achieved by the present invention which comprises:

a method for providing surge capacity and for smoothing out the flow rate of refuse in a refuse feed system wherein refuse is loaded onto a moving conveyor at variable or intermittent rates, comprising:

1. preventing excess refuse from passing beyond a given point on the conveyor by providing a rotating leveler spaced at a predetermined distance from the conveyor so as to permit a desired level of refuse to remain on the conveyor behind the leveler, and 2. rotating the leveler at a surface speed greater than the speed of the conveyor, the direction of travel of the leveler being opposite to the direction of travel of the refuse on the conveyor, whereby refuse in excess of the amount desired to be retained on the conveyor is caused to be retained behind the leveler as a rolling inventory of refuse, thereby causing the refuse to be discharged from the conveyor at a constant and uniform rate.

The conveyor may comprise a single unit, having a horizontal section and an inclined section, or it may consist of two separate units, a horizontal unit and an inclined unit.

Various materials, such as oil, char or sewage sludge can be conveniently mixed with refuse by feeding a stream of such material into the rolling inventory of refuse on the conveyor behind the leveler. The tumbling action produced on the refuse by the opposite rotation of the leveler and the conveyor produces good mixing action.

The present invention is particularly useful for feeding refuse at a constant and uniform rate to the pelletizing feeder device described and claimed in co-pending (commonly assigned) U.S. Application Ser. No. 675,934, filed Apr. 12, 1976 by J. F. Pelton, entitled "Refuse Pelletizer", the disclosure of which is incorporated herein by reference. The present invention is also particularly useful in conjunction with systems for the disposal of solid waste and resource recovery such as disclosed in U.S. Pat. No. 3,729,298.

THE DRAWINGS

FIG. 3 illustrates still another embodiment of leveler means provided with teeth.

FIG. 4 illustrates, in side elevational view, an alternative embodiment of apparatus for carrying out the present invention.

Figure 5:
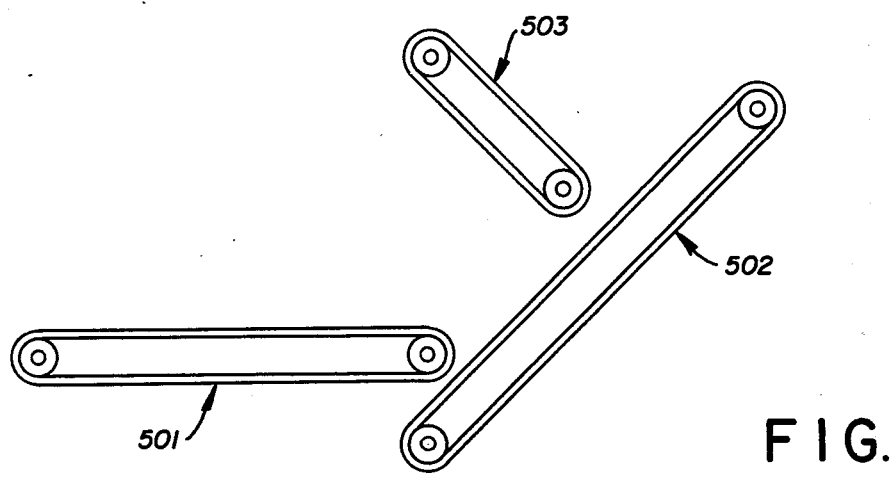

FIG. 5 schematically illustrates, in side elevational view, still another embodiment of apparatus for carrying out the present invention.

DETAILED DESCRIPTION

Figure 1:
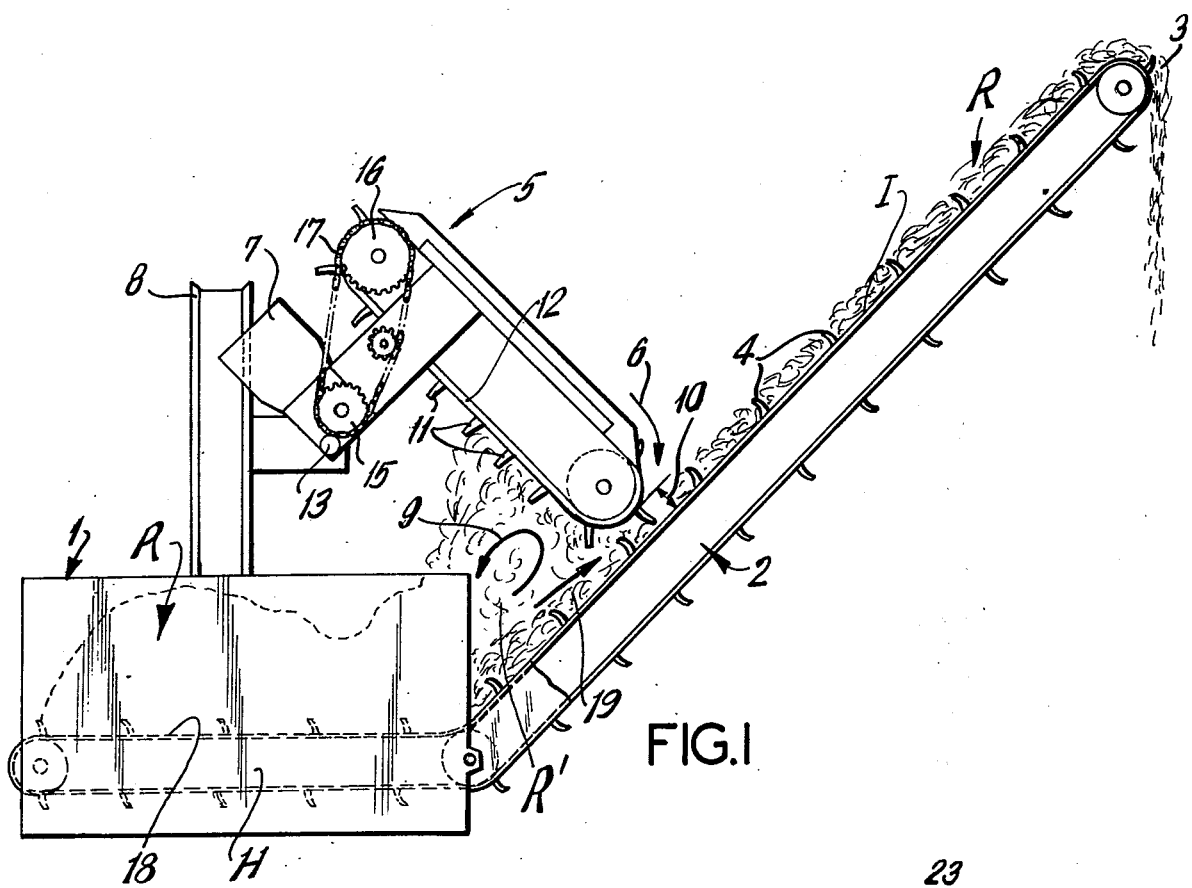
FIG. 1 is a side elevational view of a preferred embodiment of apparatus for carrying out the present invention.

As shown in FIG. 1, raw refuse material may be intermittently fed into a feed chamber 1, for example, by dumping refuse from a truck (not shown). Shredded refuse could similarly be fed into chamber 1 by a conveyor from a refuse shredder. In either case, the refuse delivered to the feed chamber 1 is deposited onto the horizontal section H of an endless belt conveyor 2. Conveyor 2 is a horizontal-inclined conveyor with the inclined section I preferably angled between 30° and 45° to the horizontal. The refuse conveyor 2 is preferably provided with cleats or slats 4; these are projections extending upwardly from the surface of the conveyor belt 18, spaced transversely across the belt in order to help keep the refuse from sliding off the belt.

Refuse R is loaded on the horizontal section H of conveyor 2 and moved by the endless belt 18 in the direction indicated by arrow 19. As the refuse approaches the leveling device 5, comprising an endless belt 12 with cleats 11, the action of the leveler 5, rotating in the direction of arrow 6, is to push the refuse on the inclined section I of the conveyor 2 backwards.

The leveler 5 is preferably positioned at a right angle to the inclined section I of feed conveyor 2. Belt 12 is driven by a motor 7, through the linkage of sprockets 15 and 16, by chain 17. The speed of leveler belt 12 is greater than the speed of conveyor belt 18. Preferably, leveler belt 12 is moving at least twice as fast as the conveyor belt 18. Leveler means 5 is supported above the conveyor 2 by a support housing 8. There is a pivot 13 between the leveler 5 and its support structure 8 which allowed the leveler 5 to ride up and over large piles of refuse, in the event motor 7 fails to operate or is temporarily shut off. The purpose of this pivot is to prevent damage to the leveler.

As the refuse encounters the leveler 5, the rotational motion of the belt 12 imparts a skimming action and rolling motion to the refuse, as indicated by arrow 9. Refuse below the depth indicated by numeral 10 passes to the discharge end 3 of conveyor 2. The relative motion of the refuse conveyor 2 and the leveler 5 retains the excess material, i.e., above depth 10 on conveyor 2 a rolling inventory of refuse. The amount of refuse retained in this rolling inventory depends upon the quantity of refuse R periodically dumped into chamber 1; it will grow larger or smaller and provide a surge capacity from which conveyor 2, with the aid of leveler 5, will feed the refuse at a constant and uniform rate. The quantity of refuse discharged from conveyor 2 at end 3 will depend on the depth of refuse 10 remaining on the belt and speed of conveyor 2. It is important that the surface speed of leveler 5 be at least twice as fast, and preferably ten times faster than the surface speed of conveyor 2 in order to provide the rolling inventory of refuse R' sought to be maintained on the conveyor 2.

The rolling inventory of refuse R' provides an ideally suitable place for mixing material, such as for example, oil, char or sewage sludge (which may be dewatered) with the refuse. The rolling action produced by the cooperation of the rotating leveler 5 and the moving belt conveyor 2 cause the refuse to become well mixed with any such added material.

While the embodiment illustrated in FIG. 1 shows a refuse conveyor having an inclined section, a horizontal conveyor as illustrated in FIG. 4 may also be used to carry out the method of the present invention. Refuse conveyor 30 transports material from feed end section 31 to discharge end 32. Refuse R, loaded on conveyor 30 at end 31 in feed chamber 29, is moved by the conveyor 30 in the direction of arrow 48 until it meets the leveler 41, rotating in the direction shown by arrow 49. Leveler 41 prevents refuse above the depth indicated by reference numeral 33 from passing beyond the leveler. Leveler 41 comprises an endless conveyor belt 34, equipped with slats or cleats 35, preferably aligned transversely across and equally spaced around conveyor belt 34. Leveler 41 is preferably inclined at an angle of about 45° to the horizontal conveyor 30. Conveyor 30 is driven by a motor (not shown) attached to axle 42. Also attached to the axle 42 is a sprocket-wheel 36. A chain 37 connects sprocket-wheel 36 to sprocket-wheel 38, which in turn is connected to an axle 43 which drives belt 34 of the leveler 41. Rotation of axle 42 consequently drives both the refuse conveyor 30 and leveler 41. The ratio of the circumference of sprocket-wheel 36 to sprocket-wheel 38 is such that the surface speed of belt 34 is at least twice that of the speed of refuse conveyor 30. Material coming in contact with leveler 41 is rolled back as shown by arrow 44. Material below depth 33 passes under the leveler 41 to the discharge end 32. Support arm 45 allows the height of leveler 41 to be adjusted with respect to the conveyor 30 in combination with adjusting positions 46.

A preferred modification of the apparatus of FIG. 1 is illustrated schematically in FIG. 5. Here the refuse is conveyed by two separate units, a horizontal unit 501, and an inclined unit 502. The leveler 503 functions similarly to the leveler shown in FIG. 1. This apparatus works best if the speed of the inclined conveyor 502 exceeds that of the horizontal conveyor 501. The surface speed of the leveler 503 must exceed that of the inclined unit. Each of these units may be driven by conventional drive means well known in the art.

Figure 2:
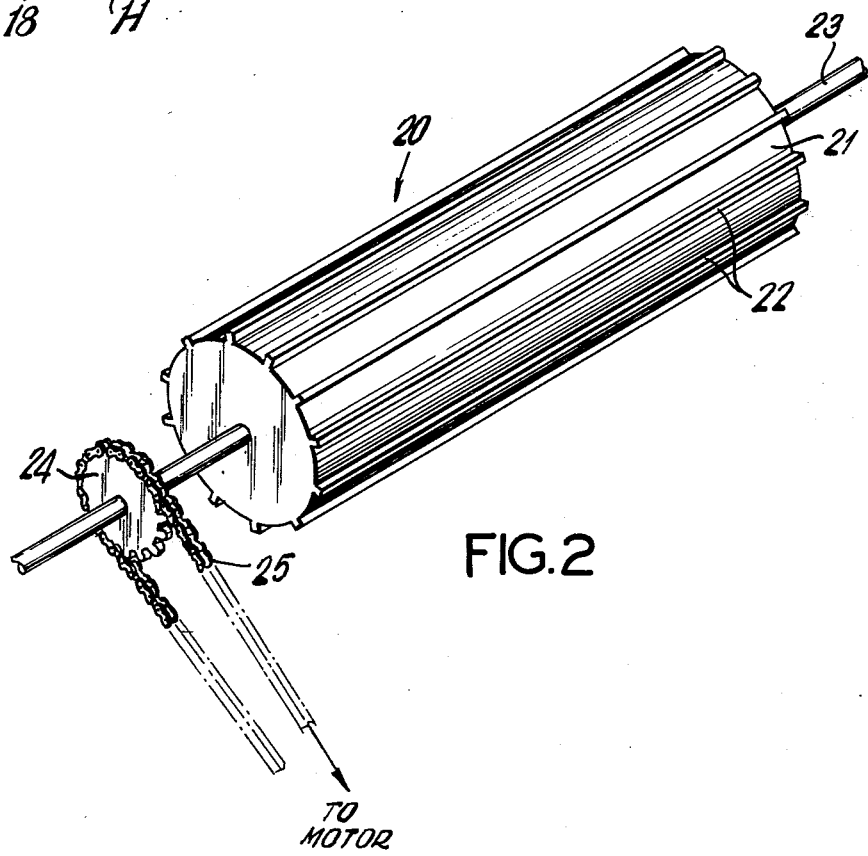
FIG. 2 illustrates an alternative embodiment of leveler means provided with cleats or slats.

It is not necessary for the leveler to comprise an endless conveyor, a barrel or cylinder as shown in FIGS. 2 and 3 may be employed. FIG. 2 illustrates a leveler 20 which could be suspended above the inclined portion I of conveyor 2 in place of leveler 5. Cylindrical leveler 20 would be suspended in such manner that its surface 21 would be spaced a sufficient distance from conveyor 2 to retain the desired depth of refuse on the conveyor. Surface 21 of leveler 20 is preferably equipped with outwardly extending projections 22, aligned transversely across and equally spaced around the cylinder. Axle 23, extending through the center of cylindrical leveler 20, may be driven by a sprocket-wheel 24 which is affixed to axle 23 and driven by chain 25 connected to a motor (not shown).

An alternative embodiment of a cylindrical leveler 101 is shown in FIG. 3. Here teeth 100 form an integral part of the cylinder 100. Leveler 101 would be mounted and operated in the same manner as described in detail with respect to leveler 5 in FIG. 1.

The desired angle of inclination of the refuse conveyor will influence the selection of the type of leveler that will be most effective. As a general rule, as the angle of inclination of the refuse conveyor is increased, the surface area of the leveler required to perform its requisite function decreases. In other words, whereas an endless belt type leveler is virtually essential for performing the leveling and inventorying function on a horizontal refuse conveyor, a cylindrical barrel could be employed with a refuse conveyor inclined at 45°. Additionally, when employing an endless belt type leveler, the angle between it and the refuse conveyor becomes important. With a horizontal refuse conveyor, an angle of 45° between the leveler and refuse conveyor is preferred. Angles over 90° should be avoided, since these will typically lead to material carryover. Angles below 45° should also be avoided, since as the angle is reduced below 45°, the requisite work to be performed by the leveler increases. However, as the inclination of the refuse conveyor increases, the angle between it and the leveler becomes less critical.

Another advantage of the present invention resulting from rolling inventory of refuse is that the refuse discharged from the conveyor is made more uniform in composition. That is, changes in the composition of refuse fed to the system, e.g. as from predominantly household waste to an industrial waste, will be made less severe by the mixing effect since the conveyor will discharge a mixture of the two wastes, rather than abruptly change from one to the other. This will benefit the refuse converter operation by minimizing abrupt changes in the composition of the refuse fed to the converter or furnace.

What is claimed is:

1. A method for providing surge capacity and for smoothing out the flow rate of refuse in a refuse feed system wherein refuse is loaded onto a moving conveyor at variable or intermittent rates, comprising:
    1. preventing excess refuse from passing beyond a given point on the conveyor by providing a rotating leveler spaced at a predetermined distance from the conveyor so as to permit a desired level of refuse to remain on the conveyor beyond the leveler, and
    2. rotating the leveler at a surface speed greater than twice the speed of the conveyor, the direction of travel of the leveler being opposite to the direction of travel of the refuse on the conveyor, whereby refuse in excess of the amount desired to be retained on the conveyor is caused to be retained behind the leveler as a rolling inventory of refuse, thereby causing the refuse to be discharged from the conveyor at a constant and uniform rate.

2. The method of claim 1 wherein the conveyor is a single unit having a horizontal section and an inclined section.

3. The method of claim 1 wherein the conveyor comprises two separate units, a horizontal unit and an inclined unit.

4. The method of claim 1 wherein the surface speed of the leveler is ten times the speed of the conveyor.

5. The method of claim 3 wherein the speed of the inclined unit is greater than the speed of the horizontal unit, and the surface speed of the leveler is greater than the speed of the inclined conveyor unit.

* * * * *

UNITED STATES PATENT OFFICE
CERTIFICATE OF CORRECTION

Patent No. 4,060,167　　　　　　　　　Dated　November 29, 1977

Inventor(s) George Edwin Smith

It is certified that error appears in the above-identified patent and that said Letters Patent are hereby corrected as shown below:

In column 3, line 37, delete "an" and insert therefor -- a --.

In column 3, line 37, delete "ideally".

Signed and Sealed this

Fourteenth Day of March 1978

[SEAL]

Attest:

RUTH C. MASON
Attesting Officer

LUTRELLE F. PARKER
Acting Commissioner of Patents and Trademarks